United States Patent [19]
Lee et al.

[11] Patent Number: 5,755,300
[45] Date of Patent: May 26, 1998

[54] VARIABLE-ASSIST POWER STEERING APPARATUS

[75] Inventors: Byeong Jo Lee, Wonju; Yong Hak Kim, Seoul; Jea Duk Kim, Wonju, all of Rep. of Korea

[73] Assignee: Mando Machinery Corporation, Gunpo, Rep. of Korea

[21] Appl. No.: 670,129

[22] Filed: Jun. 25, 1996

[30] Foreign Application Priority Data

Jun. 29, 1995 [KR] Rep. of Korea ............... 1995-18190

[51] Int. Cl.[6] .................................................. B62D 5/06
[52] U.S. Cl. ............................................................. 180/421
[58] Field of Search ................................. 180/417, 418, 180/419, 420, 421, 422, 423

[56] References Cited

U.S. PATENT DOCUMENTS

| | | | |
|---|---|---|---|
| 4,678,052 | 7/1987 | Suzuki et al. | 180/421 |
| 4,681,184 | 7/1987 | Suzuki et al. | 180/421 |
| 5,135,068 | 8/1992 | Emori et al. | 180/421 |
| 5,511,630 | 4/1996 | Kohata et al. | 180/421 |

*Primary Examiner*—Stephen Avila
*Attorney, Agent, or Firm*—Foley & Lardner

[57] ABSTRACT

An oil volume control valve 100 is arranged between a power cylinder 10 and an oil passage change valve in a parallel manner. The compressed oil of chamber 11 or 13 of a power cylinder can be bypassed toward a tank 50 through bi-directional orifices 136, 138 of a spool 130 depending on the position of the spool 130. The opening degree of the orifices 136, 138 is controlled by the speed and steering velocity of the vehicle.

14 Claims, 7 Drawing Sheets

VARIABLE-ASSIST POWER STEERING APPARATUS

FIELD OF THE INVENTION

The invention relates to a power steering apparatus, and more particularly, to a variable-assist power steering apparatus providing an oil volume control valve having a bi-directional orifice, the opening degree of which is controlled by the speed and steering angular velocity of the vehicle equipped therewith.

DESCRIPTION OF THE PRIOR ART

Figure 7:
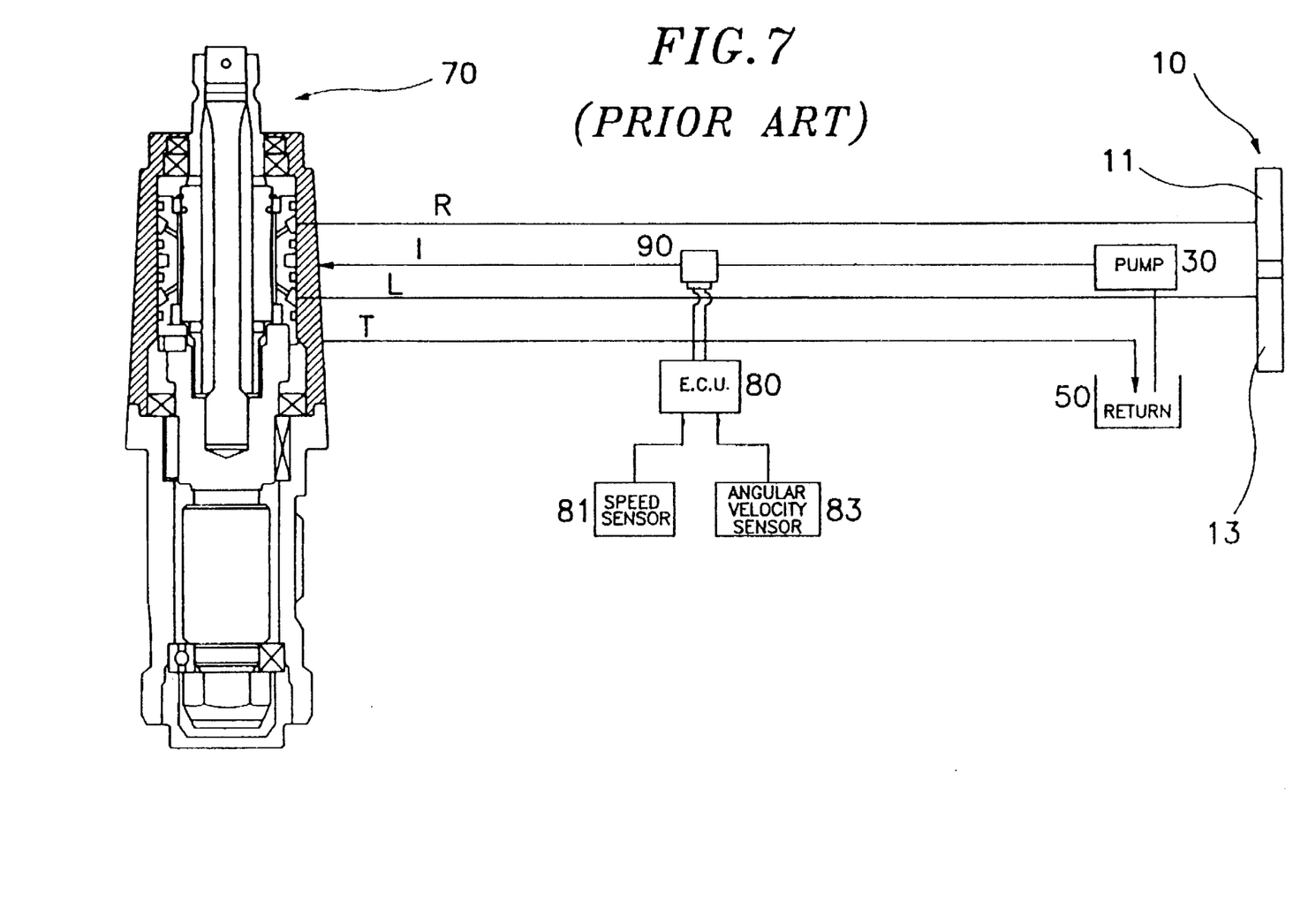
FIG. 7 is a partial section view of an oil passage change valve and an oil volume control valve according to a prior art.

In a conventional power steering apparatus, oil volume discharged from a pump driven by the engine is controlled, and thus steering assist force is regulated. FIG. 7 shows a conventional power steering apparatus. A pump 30 is driven by an engine (not shown) and the oil of a tank 50 passes an oil supply line I through an oil volume valve 90 and finally is intaken into an oil passage change valve 70. Depending on the oil supply direction of the oil passage change valve 70, the oil is supplied to a left or right chamber 13 or 11 through selectable oil discharge line R or L to perform the steering operation.

The speed and steering angular velocity of a vehicle are detected by a speed sensor 81 and an angular velocity sensor 83, and respective signals are transmitted to an electronic control unit 80. The electronic control unit 80 conveys a variable steering assist force control signal being appropriated with the present condition to the oil volume control valve 90. The oil volume control valve 90 controls linearly the oil volume supplied to the oil passage change valve 70 depending on the electric control signal of the E.C.U. 80.

As a result of the arrangement in which the oil volume control valve 90 is placed between the oil passage change valve 70 and the pump 30, it takes a relatively long time for the oil discharged from the pump to reach the power cylinder 10 through the oil volume control valve 90, thus causing a problem of responsiveness of the power cylinder 10 related to the volume change of the oil.

Since a single directional oil passage I is provided between the pump 30 and the oil passage change valve 70, a flow direction of the oil volume control valve 90 is fixed also in a single direction. To increase the responsiveness of the power cylinder 10 described above, the oil volume control valve 90 must be arranged between the oil passage change valve 70 and the power cylinder 10. However, two orifices are required to connect the oil volume control valve 90 in a single direction with the left and right chambers 13,11.

Further, since the high and low pressure portions have a bi-directional attitude depending on a right or left direction operation of a steering wheel, the pressure passed through the oil volume control valve must have the same characteristic curve in both directions.

On the other hand, assuming that the compensating slope of the solenoid electricity relating to a steering angular velocity has the same value even when in the middle or high speed range, in the case when a compensating slope is set to a compensating value of rapid steering when at middle speed, the compensating value is relatively large even when in on-center range of high speed. Contrastly, in the case when a compensating slope is set to a compensating value of high speed, the compensating value is not enough in respect to rapid steering when at middle speed.

Figure 8A:
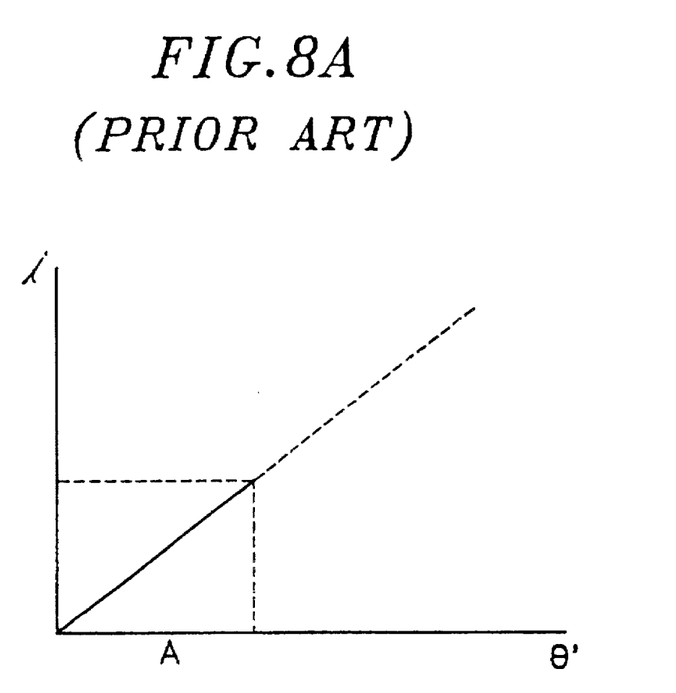
FIG. 8A is a graph showing a compensating slope of the solenoid electric value related to the steering angular velocity when at high speed according to a prior art.
Figure 8B:
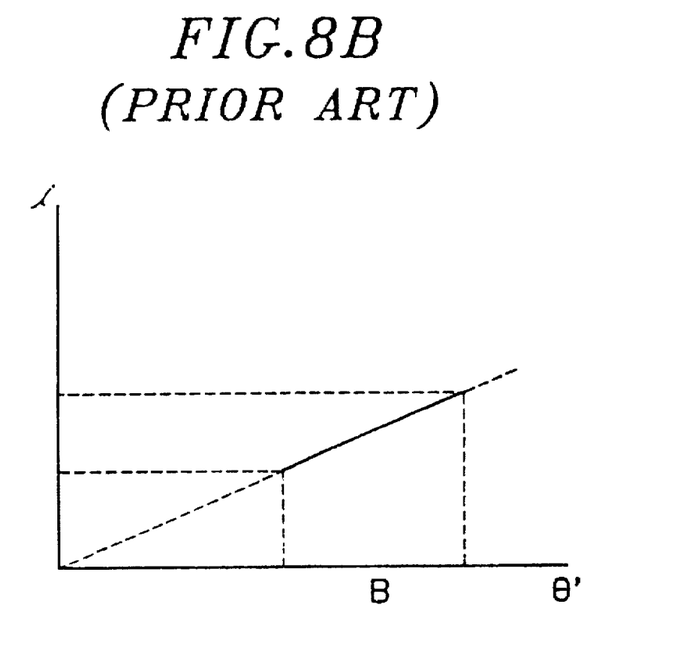
FIG. 8B is a graph showing a compensating slope of the solenoid electric value related to the steering angular velocity when at high speed according to a prior art.

FIGS. 8A and 8B are graphs showing a compensating slope of solenoid electricity relating to the steering angular velocity when at high or middle speed. As shown in FIG. 8A, if the electric compensating slope is steep, a large amount of electricity is applied even in the lower angular velocity area A, and the oil passage is opened to a large degree. A large volume of oil is supplied to the power cylinder, thus causing the feeling of the wheel to dangerous over-steering.

As shown in FIG. 8B, if the electric compensating slope is gradual, a small amount of electricity is applied even in the high angular velocity area B, and the oil passage is opened to a smaller degree. A small volume of oil is supplied to the power cylinder. When the piston of the power cylinder moves, the compressed oil can not follow the movement of the piston immediately. It brings a problem of a catch-up phenomenon or the pull of the piston toward the initial position ( the compressed chamber).

SUMMARY OF THE INVENTION

It is, accordingly, an object of this invention to provide a power steering apparatus capable of increasing the responsiveness of a power cylinder in respect to the oil volume change.

It is a further object of this invention to provide a power steering apparatus capable of showing the same characteristic curve in respect to the bi-direction of a power cylinder.

It is another object of this invention to provide a power steering apparatus capable of rapidly supplying the proper oil volume into a power cylinder according to the speed and the steering angular velocity.

In accordance with the present invention, the power steering apparatus comprises a power cylinder having two chambers, an oil passage change valve having a passage connecting the one chamber of the power cylinder with a high pressure pump and the other passage connecting the other chamber of the power cylinder with an oil tank under atmospheric pressure, and an oil volume control valve arranged between the passage of the power cylinder and of the oil passage change valve in parallel manner, the oil volume control valve having a bi-directional orifice of a spool, the opening of the orifice being controlled in accordance with the speed and steering angular velocity of a vehicle, thereby bypassing the oil of the compressed chamber of the power cylinder toward the tank.

Further, the bi-directional orifice of the spool provides a large crescent orifice and a small crescent orifice.

DESCRIPTION OF PREFERRED EMBODIMENT

Figure 1:
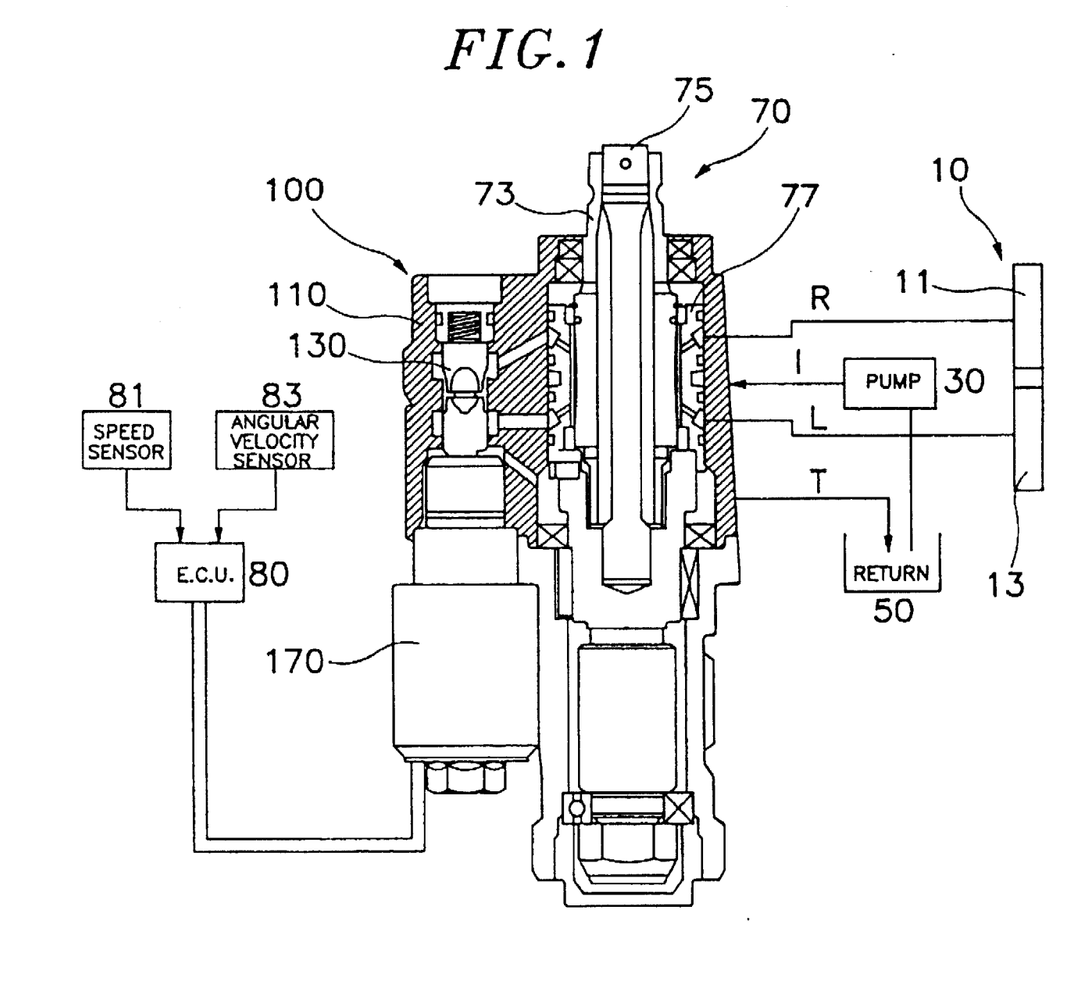
FIG. 1 is a partial sectional view of an oil passage change valve and an oil volume control valve according to the present invention.
Figure 2:
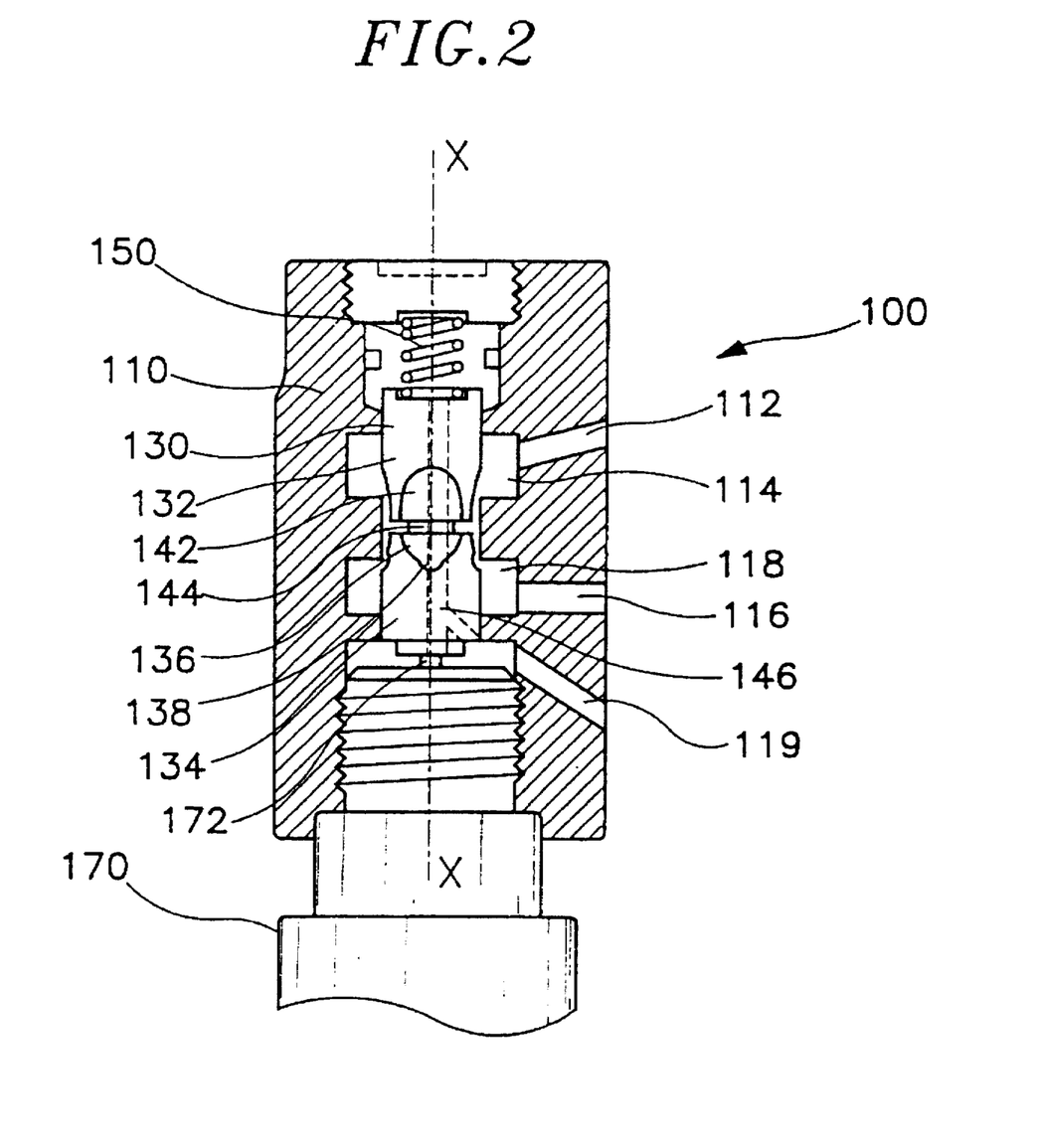
FIG. 2 is an enlarged view of the oil volume control valve of FIG. 1.

FIG. 1 shows a power steering apparatus having an oil volume control valve 100 of the present invention. FIG. 2 shows the oil volume control valve 100. Hereafter, the same components as the prior art are designated by the same numeral. Thus, no detailed explanation of the same components will be provided.

The oil discharged from the pump 30 is conveyed directly to the oil passage change valve 70 through the oil supply line I. The oil drawn into the oil passage change valve 70 is supplied into the power cylinder 10 through the selectable oil discharge line R or L owing to the relative rotation between a rotary valve and an input shaft connected to a torsion bar 75.

Subsequently, the oil discharged from the oil passage change valve 70 is returned to the tank 50 under the atmosphere through the oil return line T. For instance, as the input shaft 73 is rotated in a right direction, the high pressure oil discharged from the pump 30 is drawn in the first chamber 11 of the power cylinder 10 through the selected oil discharge line R via the oil passage change valve 70. Simultaneously, the other oil discharge line L is connected with the tank 50 to turn to the atmosphere.

On the oil line between the power cylinder 10 and the oil passage change valve 70, an oil volume control valve 100 is provided in parallel.

The oil volume control valve 100 comprises a housing 110, a spool 130 slidably provided in the housing 110, a spring 150 applying the continuous expanding force to the spool 130 and a solenoid 170 applying force to the spool 130 in proportion to the electrical value generated from the E.C.U. 80.

The housing 110 comprises a first passage 112 communicated with the oil discharge line R of the oil passage change valve 70, a second passage 116 communicated with the oil discharge line L. Further, the housing 110 comprises a first groove 114 communicated with the first passage 112 and a second groove 118 communicated with the second passage 116.

The spool 130 is comprised of a first rib 132 contacted onto the spring 150 and a second rib 134 contacted onto the pin 172 of the solenoid 170. Between the first rib 132 and the second rib 134, a land 144 is provided. In this structure, only the expanding force of the spring 150 and the operating force of the pin 172 of the solenoid 170 should be applied to the spool 130. Thus, to eliminate the exterior factor applied to the spool 130, a through passage 146 is formed in the spool 130. Further, the high pressure oil can be leaked between the inside of the housing 110 and the circumference of the spool 130 and the leaking oil can be returned to the tank 50 through a leak passage 119 formed in the housing 110.

The first rib 132 of the spool 130, adjacent to the first groove 114, provides a large crescent passage 142 always communicating with the first groove 114. A large crescent orifice 136 is formed at the second rib 134 opposite the large crescent passage 142 so as to eliminate a back-up pressure generated from the first oil passage R or the second oil passage L.

Further, a small crescent orifice 138 is formed on an arc of the large crescent orifice adjacent to the second groove 118. The size of the small crescent orifice 138 depends on the control range in respect to the volume of the bypassing oil.

To obtain a smooth flow of the oil, the shaft of the large crescent orifice 136 and that of the small crescent orifice 138 are parallel with the longitudinal shaft X—X of the spool 130. Further, the shafts of the orifices 136,138 are coaxial. It is desirable that the shaft of the large crescent passage 142 is arranged with the shafts of the orifices 136,138 concentrically.

Figure 3A:
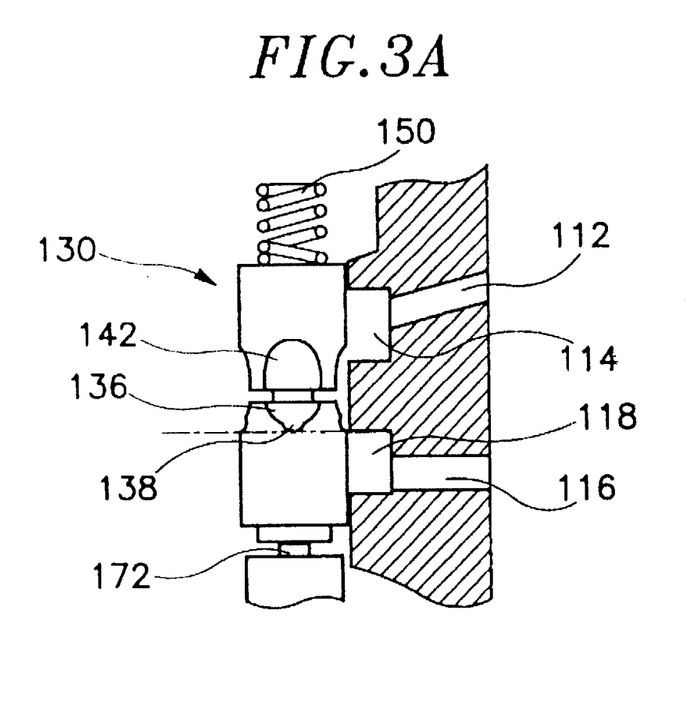
FIGS. 3A,3B and 3C are schematic views illustrating the movement of the oil volume control valve in respect to various vehicle speeds.

The valve 100 having the construction as described above, is operated as follows. When at idle or low speed of a vehicle (FIG. 3A), a large amount of electricity is applied to the solenoid 170 and the pin 172 of the solenoid 170 pushes the spool 130 toward the spring 150 against the expanding force of the spring 150. Since the small crescent orifice 138 is not communicated with the second groove 118, the high pressure oil from the first passage 112 (or second passage 116) is not bypassed to the second passage 116 (or first passage 112). Thus, the oil supplied to each chamber 11 or 13 of the power cylinder 10 from the pump 30 via the oil passage change valve 70 is no longer affected. Therefore, stable steering operation is possible.

When at high speed of a vehicle (FIG. 3C), the E.C.U. 80 receives the speed signal detected by the speed sensor 81 and the amount of electricity determined according to the speed (FIG. 4) is transmitted to the solenoid 170. Since the expanding force of the spring 150 is larger than the pushing force of the pin 72, the spool 130 moves down so that the large crescent orifice 136 and small crescent orifice 138 are communicated with the second groove 118.

Figure 3B:
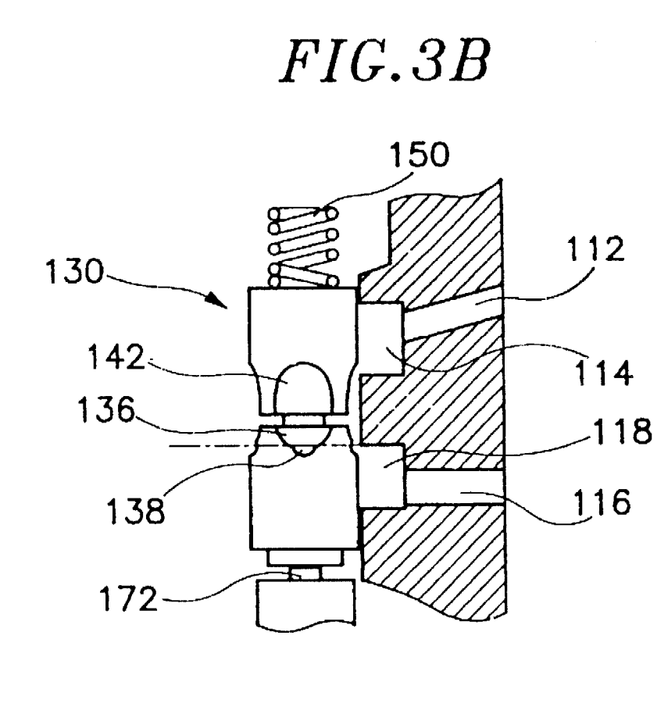
Figure 3C:
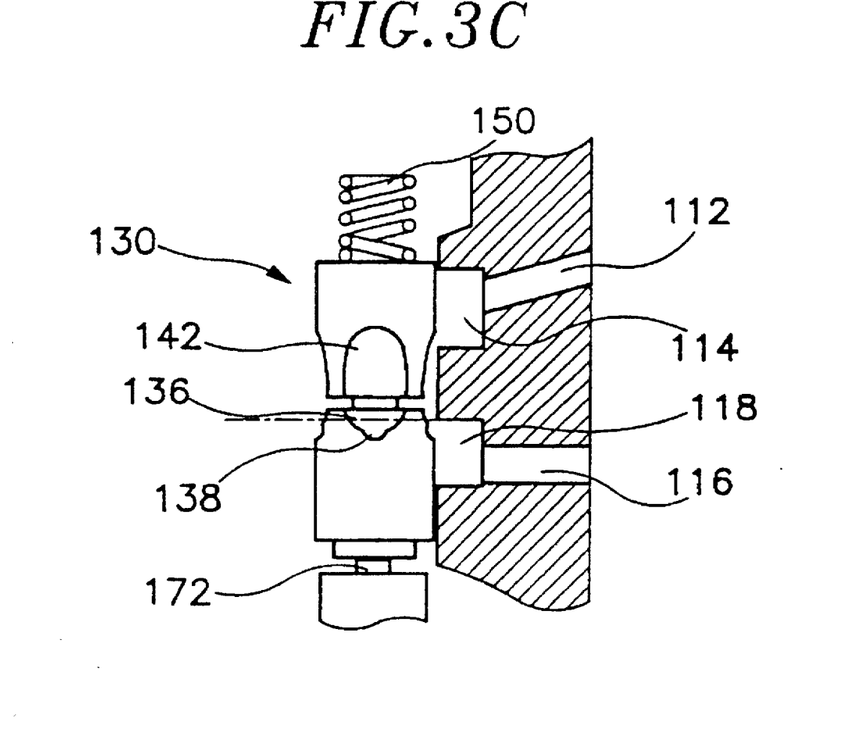
Figure 4:
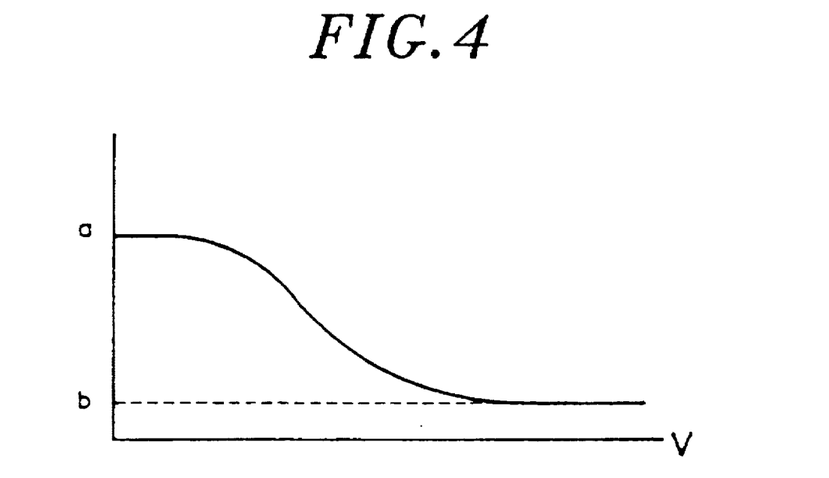
FIG. 4 is a graph showing the solenoid electric value related to the speed of vehicle.

Part of the oil discharged from the compressed first chamber 11 or second chamber 13 is bypassed to the tank 50 via the orifices 136,138 opened according to the low value $i_b$ of the electricity. That is, when the first passage 112 is at high pressure, part of the high pressure oil is returned to the atmospheric tank 50 through the second passage 116 via the large crescent passage 142, the large crescent orifice 136 and the small crescent orifice 138. Contrastly, when the second passage 116 is at high pressure, part of high pressure oil is returned to the atmospheric tank 50 through the first passage 116 via the small crescent orifice 138, the large crescent orifice 136 and the large crescent passage 142.

On the other hand, when at middle speed of a vehicle (FIG. 3B), the high value ia of the electricity determined according to the speed (FIG. 4) is transmitted to the solenoid 170. As the pushing force of the pin 172 counteracts the expanding force of the spring 150, the opening of both the large crescent orifice 136 and the small crescent orifice 138 or only the small crescent orifice 138 in respect to the second groove 118 is determined.

Figure 5:
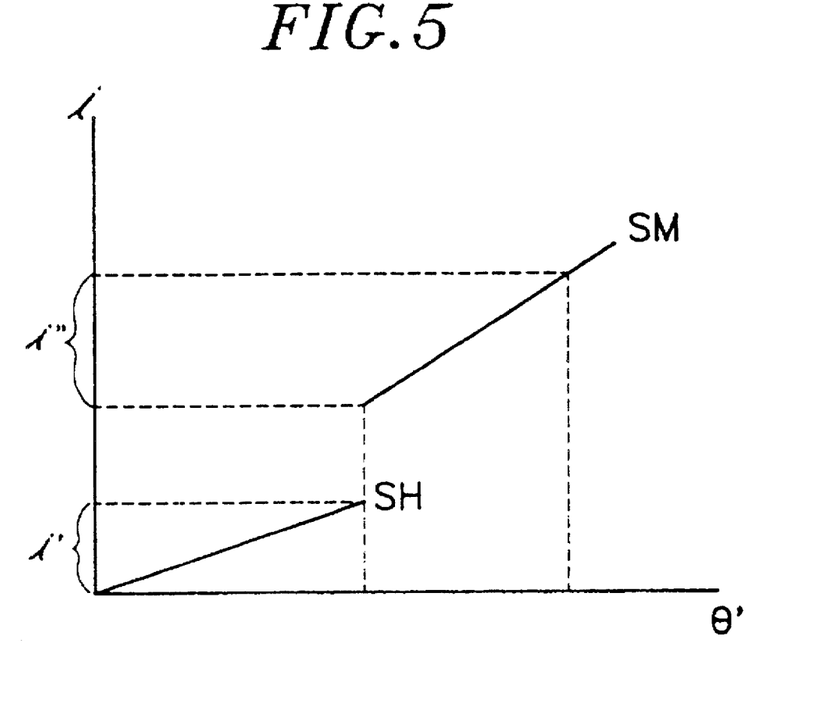
FIG. 5 is a graph showing a compensating slope of the solenoid electric value related to the steering angular velocity when at middle or high speed.

According to the electric value of the solenoid when at the middle or the high speed as above described, the spool 130 is moved. The steering is performed with the proper pressure in respect to various speeds. Simultaneously, under the constant speed, the signal detected by the steering angular velocity sensor 83 is transmitted to the E.C.U. 80 when in the high speed range. The relative low electric value i' determined according to the gradual compensating slope SH as shown in FIG. 5 is transmitted to the solenoid 170. Thus, the spool 130 is moved as the above description of FIG. 3C. The bypass volume of the oil is maximized to supply less volume of the oil to the power cylinder, maintaining the on-center position of the steering wheel well.

On the other hand, when in the middle speed range, the signal detected by the steering angular velocity sensor 83 is sent to the E.C.U. 80. At this time, the relative high electric value i" according to the steep compensating slope SM as shown in FIG. 5 is supplied to the solenoid 170. Thus, the spool 130 is moved as the above description of FIG. 3B. The bypass volume of the oil is reduced to supply a greater volume of the oil to the power cylinder, thus eliminating the catch-up phenomenon.

Figure 6:
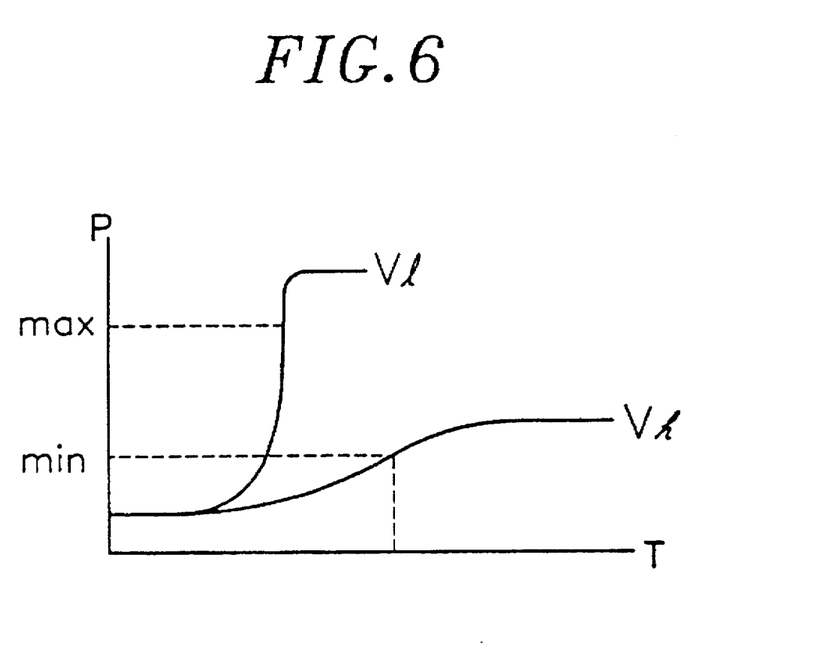
FIG. 6 is a graph showing a pressure supplied to a power cylinder according to the speed and the steering angular velocity (torque)

The characteristic varied according to the speed and the steering angular velocity of vehicle is shown in FIG. 6. Even if the steering torque corresponding to the steering angular velocity when in high speed Vh rather than in low speed Vl is increased, the pressure supplied to the power cylinder is maintained at a low and constant level.

In accordance with the invention, since the oil volume control valve is arranged between the oil passage change valve and the power cylinder, the responsibility of a power cylinder can be speeded up so as to rapidly transmit the oil volume varied by the pump to the power cylinder.

Further, since the bi-direction orifice corresponding to the bi-direction according to the pressure condition, i.e. high or low pressure, of each chamber of the power cylinder, depending on the steering direction, is installed, the same characteristic curve in respect to the bi-direction of a power cylinder is obtained.

Furthermore, since the opening of the orifice is controlled in respect to the changeable solenoid electricity compensating curve according to the speed and the steering angular velocity of the vehicle and the oil having an over-required pressure is bypassed to the tank, each chamber maintains the proper volume of oil, thereby performing more convenient and stable steering.

What is claimed:

1. A power steering apparatus for a vehicle, comprising:

a high pressure pump;

an oil tank under atmospheric pressure;

a power cylinder having two chambers;

an oil passage change valve having a first passage connecting one chamber of said power cylinder with the high pressure pump and a second passage connecting the other chamber of said power cylinder with the oil tank; and an oil volume control valve including a spool having a bi-directional orifice through which fluid communication is established between said one chamber and said oil tank, the fluid communication through said orifice being controlled in accordance with the speed and steering angular velocity of the vehicle, wherein said bi-directional orifice of the spool includes a large crescent orifice and a small crescent orifice.

2. The power steering apparatus according to claim 1, wherein respective axes of said large crescent orifice and said small crescent orifice are arranged along a longitudinal direction of said spool.

3. The power steering apparatus according to claim 1, wherein said small crescent orifice is formed on a circular arc of said large crescent orifice.

4. The power steering apparatus according to claim 3, wherein a circular arc of said small crescent orifice is extended toward one of the two passages of said oil passage change valve.

5. The power steering apparatus according to claim 2, wherein said respective axes of said large crescent orifice and said small crescent orifice are arranged in parallel with the longitudinal direction of said spool.

6. The power steering apparatus according to claim 4, wherein an opening amount of said small crescent orifice which opens to the passage is varied in accordance with speed and steering angular velocity of the vehicle.

7. The power steering apparatus according to claim 6, wherein the opening amount is zero when the vehicle is at idle or low speed, maximum when the vehicle is at high speed and a variable value between zero and the maximum when the vehicle is at an intermediate speed.

8. The power steering apparatus according to claim 1, wherein said spool further comprises a large crescent passage facing said large crescent orifice.

9. The power steering apparatus according to claim 8, wherein said spool further comprises a land disposed between said large crescent orifice and said large crescent passage.

10. The power steering apparatus according to claim 9, wherein said large crescent passage is intercommunicated with a second passage of said oil passage change valve.

11. A power steering apparatus for a vehicle, comprising:

a high pressure pump;

an oil tank under atmospheric pressure;

a power cylinder having two chambers;

an oil passage change valve which connects one chamber of the power cylinder with the high pressure pump and the other chamber of the power cylinder with the oil tank;

an oil volume control valve having a spool for selectively blocking and opening fluid communication between the chamber of the power cylinder connected to the high pressure pump and the oil tank, wherein said spool has a large crescent orifice and a small crescent orifice through which the fluid communication between the chamber of the power cylinder connected to the high pressure pump and the oil tank is opened.

12. The power steering apparatus according to claim 11, wherein the oil volume control valve comprises two oil passages respectively connected to the two chambers of the power cylinder and the spool selectively blocks and opens fluid communication between the two oil passages.

13. The power steering apparatus according to claim 12, wherein the fluid communication between the two oil passages is established through the large crescent orifice and the small crescent orifice.

14. The power steering apparatus according to claim 13, wherein the spool controls the fluid communication between the two oil passages by way of the bi-directional orifice in accordance with the speed and steering angular velocity of the vehicle.

\* \* \* \* \*